2,878,196

PROCESS FOR CREAMING PERFLUOROHALOOLE-FIN POLYMERS WITH ALGINATE CREAMING AGENTS AND COMPOSITION RESULTING THEREFROM

Malcolm R. Buffington, Short Hills, N. J., assignor, by mesne assignments, to Minnesota Mining and Manufacturing Company, St. Paul, Minn., a corporation of Delaware No Drawing. Application October 16, 1956
Serial No. 616,132

2 Claims. (Cl. 260—17.4)

This invention relates to the process for creaming a latex and to the product thereby obtained. In one aspect this invention relates to an improved and more easily handled latex. In another aspect this invention relates to creaming a highly halogenated latex. Another aspect relates to the process for creaming a latex of a perchlorofluoroolefin polymer. Another aspect relates to a creamed latex of a perchlorofluoroolefin polymer.

The polymerization of perfluorohaloolefins produces a variety of polymeric materials which are useful because of their extreme chemical resistance and thermal stability over a broad temperature range. These polymeric materials have been available for some time in the form of resins. The homopolymerization of the perfluorohaloolefins and copolymerization of perfluorohaloolefins with other hydrogen-containing halogenated olefins produce elastomers which have valuable properties. These elastomers have greatly extended the applications of the perfluorohaloolefin polymers enabling them to be used as substitutes for various natural and synthetic rubbers because of their chemical inertness, thermal stability, high impact and compressive strength and excellent dimensional stability.

One of the processes at the present time for polymerizing perfluorohaloolefins involves the use of water as an inert medium for dissipating the heat reaction. The polymerization effluent is in the form of an emulsion of the polymer in water, more frequently referred to as a latex. When this latex is coagulated, a gum or resin is obtained which is suitable for molding.

For certain applications, such as dip coating, impregnation of fabrics, spraying, knife coating and others, it is desirable to employ the polymer in the form of a latex. Since films deposited from the latex possess high dielectric strength, zero moisture absorption and are capable of withstanding temperatures up to 450° F., the latex is valuable in many applications and particularly in wire coating applications. The coating with a latex of a halogenated polymer or elastomer is difficult because of the low solids content of these latices, for example, about 25 to 30 percent solids. The coatings produced from these latices are subject to "mud cracking," to the formation of "rivers" and films tend to "creep" from the edges of a surface due to shrinkage on drying.

It is, therefore, an object of the present invention to provide a latex containing a high concentration of solid polymer particles.

Another object of this invention is to provide a method for creaming a latex.

Another object of this invention is to provide a latex containing a halogenated polymer from which a tough, adherent film with minimum tendency to shrink, can be produced.

Another object of this invention is to provide a smooth continuous coating from halogenated latices having a high concentration of solid polymer particles.

Another object of this invention is to provide chemically resistant coatings of improved thickness, with the minimum number of coating applications.

Another object is to provide a process for producing latex containing a fluorinated polymer having said improved properties and high concentration of solid polymer particles.

Various other objects and advantages will become apparent to those skilled in the art from the accompanying description and disclosure.

According to this invention, a creaming agent, which is a naturally occurring colloidal material, is admixed with a latex of a perfluorohaloolefin polymer to produce a latex having a high polymer solids content.

The present invention is applicable to the creaming of perfluorohaloolefin polymers such as homopolymers and copolymers thereof wherein the monomers contain from two to four carbon atoms. Examples of perfluorohaloolefin homopolymers are chlorotrifluoroethylene, bromotrifluoroethylene and tetrafluoroethylene homopolymers. Examples of perfluorohaloolefin copolymers are any of the above perfluorohalogenated monomers as well as perfluoropropene copolymerized with a hydrogen-containing halogenated olefin such as vinylidene fluoride, vinyl fluoride, vinylidene chloride, vinyl chloride, trifluoroethylene, 1-chloro-1-fluoroethylene and 1,1,3-trifluorobutadiene.

The perfluorohaloolefin polymer latices preferably employed in this invention comprise chlorotrifluoroethylene polymers particularly chlorotrifluoroethylene homopolymer and chlorotrifluoroethylene-vinylidene fluoride copolymer having a mole ratio of between about 20:80 and about 95:5. The preferred proportions of chlorotrifluoroethylene and vinylidene fluoride monomers for rubbery characteristics range from about 20 to about 70 moles percent of chlorotrifluoroethylene. However, it is also desirable to stabilize according to the process of this invention latices of copolymers containing between about 70 and about 95 mole percent of chlorotrifluoroethylene.

Chlorotrifluoroethylene-vinylidene fluoride copolymers are prepared in water suspension and emulsion systems. A reactor containing the desired polymerization recipe, that is, a water suspension recipe or an emulsion recipe is provided with means for introducing monomers. Chlorotrifluoroethylene and vinylidene fluoride are introduced into the reactor in the desired proportion and polymerization is allowed to take place at a desirable reaction temperature over a suitable period of time. It is usually desirable to agitate the polymerization mixture so that intimate contact of the ingredients in the mixture is provided. The other previously mentioned perfluorohaloolefin polymers are prepared similarly in the manner set forth herein.

The quantity of water employed as the aqueous suspension medium is usually between about 0.05 and about 10 times by volume of the quantity of total monomer present in the reaction zone. Preferably, the quantity of water is between about 1 and about 5 times the total monomer in the reaction zone.

The temperature employed for the polymerization depends, to some extent, upon the particular monomer or monomers being polymerized. While the temperature may be varied depending upon the type of monomer, it is preferred that the temperature be maintained below about 100° C. When copolymerizing chlorotrifluoroethylene with vinylidene fluoride, temperatures between about 10° C. and about 50° C. are most preferred.

The time also depends upon the monomer or monomers being polymerized. Generally, however, a reaction time between about 10 minutes and about 72 hours or more, usually not more than 96 hours, can be employed.

The preferred polymerization time is between about 20 and about 50 hours.

In order to produce the above polymers in an aqueous phase, in a desired molecular weight and in a reasonable length of time, a suitable promoting agent is usually added to the polymerization recipe. The promoting agents which are used fall into three general classes; promoters, activators and accelerators. In almost all instances a promoter is used. Such promoters comprise inorganic peroxides. Examples of suitable inorganic peroxides are water soluble peroxides such as the sodium and potassium perborates, persulfates, perphosphates and percarbonates, barium peroxide, zinc peroxide and hydrogen peroxide. Particularly valuable are the water soluble salts of the peracids such as the sodium, potassium, calcium, barium and ammonium salts of persulfuric acid and perphosphoric acid which may be prepared in the conventional manner by electrolytic oxidation of salts of the corresponding oxy acids. The concentration of the promoter lies within the range of between about 0.003 molar and about 0.1 molar. The exact quantity of promoter will depend upon the monomer, the molecular weight of the polymer desired and the particular promoter being employed.

The promoters are sometimes used in conjunction with an activator. The activator may be any water-soluble reducing agent. Included among the activators which are employed are sodium bisulfite, sodium hydrosulfite, sodium thiosulfate and trimethyl amine. When used, the activators are usually added to the concentration approximating the concentration of the promoter and usually in an equimolar amount based on the promoter.

Buffering agents can be employed to obtain optimum pH condensation. For example, when an alkaline pH is desired, buffers such as borax, disodium phosphate, sodium carbonate, ammonium carbonate and sodium acetate are used. For an acid pH, acetic acid, propionic acid, monosodium phosphate are employed. The pH in the reaction mixture can be maintained between about 3 and about 13 but is preferably maintained between about 6 and about 10.

In some instances, accelerating elements have been added to the polymerization mixture. These accelerators are usually variable valence metal compounds, such as ferrous sulfate, cuprous sulfate, etc., and have also included other metals such as silver, and non-metallic ions, such as iodine ion. In the absence of an accelerator, an alkaline pH range is preferred.

As indicated previously, in the copolymerization reaction the copolymer produced forms an emulsion in the aqueous system. This copolymer tends to build up on the walls of the reactors, thereby clogging lines, etc. It is, therefore, preferred to add an emulsifying agent which prevents the build up of copolymer on the reactor walls and improve the quality of the product. These emulsifying agents are fluorinated compounds which do not adversely affect the polymerization reaction. These fluorinated compounds are the fluorinated acids and the salts of the acids containing at least 6 carbon atoms. Examples of suitable emulsifying agents are fluorinated carboxylic acids, perfluorinated carboxylic acids and perfluorochlorinated carboxylic acids containing from 6 to 20 carbon atoms and alkali metal or ammonium salts of these acids. Representative of this group of compounds are α,α-dihydrodecafluoroheptanoic acid, perfluorocaproic acid, 3,5,6-trichlorooctafluorocaproic acid and alkali metal and ammonium salt derivatives of these acids.

The perchlorofluorocarboxylic acids mentioned above are prepared by the oxidation of a perhalogenated aliphatic olefin in the presence of permanganate solution at a temperature between about −120° C. and about 10° C., or by the reaction of a fluorine-containing perhalogenated telomer with fuming sulfuric acid at a temperature between about 125° C. and about 300° C. for a period of from about 5 to about 50 hours.

According to the process of this invention a latex so prepared may have a pH value between about 3 and about 13 depending on the polymerization ingredients. When the pH is below 5, it is desirable to adjust the pH to a value of between about 5 and about 13 preferably between about 6 and about 10 with the aid of potassium hydroxide, trisodium phosphate, sodium acid phosphate or any other suitable buffer solution, such as borax before stabilizing. When the latex is obtained with a low pH value, below 5, it is more susceptible to coagulation and may coagulate upon creaming as the polymer particles are concentrated in the dispersion. Since the latex is usually obtained as an acidic dispersion i. e. at a pH of between about 2 and about 5, alkaline buffer solutions are recited above. If, however, a strongly alkaline dispersion should be obtained at a pH of about 13, an acidic buffer solution, such as acetic acid or propionic acid could be employed if desired.

Suitable creaming agents which are employed in this invention are naturally occurring water soluble colloids such as locust bean gum, gum tragacanth, ammonium alginate, sodium alginate, and potassium alginate. However, it is also within the scope of this invention to employ synthetic derivatives of naturally occurring water soluble resinous products such as methyl cellulose. Of the above-mentioned creaming agents the alginate salts are preferred and ammonium alginate is most preferred.

The creaming agent is added to a latex of a perfluorohaloolefin polymer in an amount between about 0.001 and about 5 parts by weight preferably between about 0.1 and about 3 parts by weight per 100 parts of total monomer. The latex is usually obtained as an aqueous dispersion containing less than about 50 percent polymer particles and usually between about 15 and about 30 percent solid polymer particles having an average size of between about 0.05 and about 1.0 micron, preferably between about 0.1 and about 0.5 micron. After the creaming agent is added to the vessel containing latex, the dispersion is allowed to stand for a period of between about 0.5 and about 48 hours, preferably between about 1 and about 12 hours. During this period a two-phase system containing an upper and lower liquid phase is formed. The lower liquid phase contains a concentrated dispersion of polymer and the upper liquid phase or serum contains water, acid emulsifier and other contaminants. The two phases are separated by decantation, by gravimetric separation or by any other convenient method and the separated lower layer is a concentrated polymer dispersion containing up to about 70 percent solid polymer particles. If a higher solids content is desired, for example, up to about 75 percent or higher, this operation may be repeated; however, the concentrating effect diminishes with each additional creaming operation. The creamed latex may be applied directly to a substrate and baked or dried thereon to provide a tough, chemically resistant coating.

Generally, a stabilizing agent is added simultaneously with the creaming agent, however, the addition of a stabilizer may be omitted if desired or the dispersion may be first stabilized and then creamed.

Suitable stabilizers comprise the organic hydrophilic stabilizers such as amphoteric stabilizers, for example, Terginol-G (the sodium salt of a sulfonated methyl taurine), Ag Chem SA-9 (an alkylol amine fatty acid condensate), non-ionic stabilizers for example Emulphor ON (the condensate of ethylene oxide with a fatty alcohol), Triton (an aryl alkyl polyether alcohol) and Mulsor-224 (a long chain fatty acid ester containing multiple ether linkages); and anionic stabilizers, for example Santomerse (an alkyl aryl sulfonate); morpholine caseinate, perfluorocaproic acid, 3,5,7,8-tetrachloroundecafluorocaproic acid, and ammonium, sodium or potassium salts of these acids. The organic stabilizer is added to the recipe in an amount between about 0.05 and about 5 parts by weight, preferably between about 0.1 and about 3 parts by weight per 100 parts of total polymer.

The addition of creaming agent to the latex and the compounding of the creamed latex with various additives is carried out at a temperature of between about 0° C. and about 100° C., preferably at a temperature of 20° C.±5° C. or room temperature.

Further compounding of the creamed latex depends largely on the ultimate use of the product. Generally, a cross-linking or curing agent is employed in the compounding recipe. However, in cases where it is desirable to obtain a supported film, for example, on glass cloth, the curing agent may be omitted.

Suitable curing agents for the above described latex include polyamines such as pentamethylenediamine, tetraethylenepentamine, triethylenetetramine, etc.; carbamic radical containing salts of polyamines such as hexamethyleneaminocarbamic acid inner salt and organic and inorganic peroxide compounds such as, ditert-butyl peroxide, dibenzoyl peroxide, lead peroxide, magnesium peroxide, barium peroxide and zinc peroxide. The carbamic radical containing salts are prepared by reacting the corresponding polyamine with carbon dioxide under anhydrous conditions.

Although the curing agent may be added at any step during the compounding of the creamed latex, it is preferably added as the final ingredient, before curing the latex. An amount of between about 0.1 and about 5 parts by weight, preferably between about 0.2 and about 2 parts by weight per 100 parts of total polymer is added to the creamed latex. When a curing agent is employed, an accelerator is also employed in most instances. However, it is within the scope of this invention to employ a curing agent in the absence of an accelerator. Suitable accelerators comprise metal oxides such as lead oxide, zinc oxide, magnesium oxide, and lead oxide-lead phosphite mixtures and any combination of the foregoing oxides. When an accelerator is used, it is employed in an amount between about 1 and about 25 parts by weight preferably between about 5 and about 15 parts by weight per 100 parts of total polymer of the creamed latex.

Inert fillers can be added to the polymer latices discussed above to improve the molding characteristics. When a filler is employed, it is added to the compounding recipe in an amount between about 0.5 and about 25 parts by weight, preferably between about 5 and about 20 parts by weight per 100 parts by weight of polymer. Examples of fillers which may be used to improve physical properties of the polymer latices involved in the process of this invention are Syton-200 silica, Ludox (an aqueous colloidal silica containing approximately 30 percent $SiO_2$ with less than 0.5 percent $Na_2O$ as stabilizer), a precipitated silica such as Hysil-303, a silicon tetrachloride which has been treated in an oxidizing flame such as Cabosil and a clay silicate such as magnesium aluminum silicate (Iceberg Pigment).

Another filler which increases modulus, tensile strength and hardness of the polymer latex is a high abrasion furnace carbon or carbon black such as, for example, Statex-R carbon black, Phil-black O, channel black and thermal black. Although from about 5 to about 100 parts by weight of carbon black may be employed per 100 parts of polymer, it is generally preferred to use from about 1 to about 50 parts of black, and most preferably from 15 to 25 parts.

Other additives can be added to the creamed polymer latices and include thickeners and coloring agents. The addition of thickeners increases the viscosity of the latex. For certain applications wherein a higher viscosity is required such as, for example, in a coating process where the latex is spread on to an article to be coated and it is desirable to maintain a thick viscous coat on the surface thereof during the drying process, thickeners are employed. The thickening agent is added until the viscosity of the latex is such that it is desirable for the particular application. Representative of the thickening agents which may be used for the above described latices are the sodium, potassium and ammonium salts of acrylates for example Tigum; salts of cellulose ether for example, carboxymethyl cellulose and methyl cellulose; and morpholine caseinate. Of the above thickening agents, ammonium acrylate and methyl cellulose are most preferred.

Various colors can be added to the latex recipe before curing. Such coloring compounds as chrome oxide green, iron oxide red, alumina sulfide yellow and chrome yellow possess the heat resistance necessary for coloring additives which are employed with these latices.

The additives which are compounded with the latices hereindescribed are water-soluble and water-insoluble compounds. Additives which are water-soluble are added to the compounding recipe in solution; those which are water-insoluble, such as, for example, zinc oxide, dry fillers and colors are added in the form of a water dispersion prepared by grinding in a ball mill.

After the creamed latex has been compounded with some or all of the above additives, it is cast as a free film on a non-vaporous surface or it is applied to a substrate as a coating by any convenient technique such as, for example, by dipping the substrate into the latex, by knife coating or by spraying. The film is then dried and cured. The film is preferably dried at a temperature below 200° F. and then cured by subjecting it to a temperature of between about 200° F. and about 300° F. preferably between about 200° F. and about 250° F. for a period of from 1 minute to about 2 hours, preferably 5 minutes to about 30 minutes and then baking the film in an oven at a temperature between about 200° F. and about 400° F., preferably at about 350° F. for a period of from 0.5 to 25 hours depending on the cross-sectional thickness of the film.

The following examples are offered as a better understanding of the present invention and are not to be construed as unnecessarily limiting thereto.

*Example 1*

To a large separatory glass funnel containing 200 parts by weight of a latex of a copolymer comprising 30 mole percent chlorotrifluoroethylene and 70 mole percent vinylidene fluoride and containing 25 percent solid polymer particles was added with stirring 1.75 parts by weight of a 20 percent water solution of Emulphor ON (a condensate of ethylene oxide and a fatty alcohol) and 10 parts by weight of a 2 percent water solution of ammonium alginate.

The dispersion was allowed to stand for 24 hours during which time two liquid layers formed. The bottom layer which contained concentrated latex was bled off, collected and was found to contain 65 percent solid polymer particles.

*Example 2*

To a large separatory glass funnel containing 200 parts by weight of a latex of a copolymer comprising 30 mole percent chlorotrifluoroethylene and 70 mole percent vinylidene fluoride having a solids content of about 20 percent, was added, with stirring, 12 parts by weight of a 2 percent water solution of sodium alginate.

The dispersion was allowed to stand for 12 hours during which time two liquid layers were formed. The lower liquid layer was bled off, collected and the dispersion was analyzed and found to have 70 percent solid polymer particles.

Any of the polymer latices, particularly the latex of the copolymer of perfluoropropene and vinylidene fluoride and any of the other creaming agents and other additives heretofore described may be substituted and similarly admixed in either of the preceding examples without departing from the scope of this invention.

The creamed latices of the present invention which have a chemical resistance to oils, fuels and other chemical reagents, such as, for example, ozone, Freon, methyl chloride, etc., may be applied to surfaces to give chemically and moisture resistant coatings. The application of a single coat provides a thick, continuous film which is not subject to shrinkage, mud cracks and the formation of rivers on drying. As coatings, they may be applied to fabrics, coated wires, wood, plastics, etc., and are particularly valuable as linings for fuel cells, as coatings for wire having a braided fabric covering, as high chemically resistant laminated materials and as coatings for protective clothing such as gloves, shoes, aprons and the like. Chlorotrifluoroethylene-vinylidene fluoride latex is also applicable as a corrosion resistant paint or as a base coating.

Many other applications are contemplated and will occur to those skilled in the art. This creamed chlorotrifluoroethylene-vinylidene fluoride latex which will withstand temperatures as high as 450° F., or higher while still maintaining its rubbery characteristics has a minimum shelf life of at least 30 to 60 days.

This invention relates to a creamed latex containing up to about 70 percent or higher solid polymer particles which is produced by admixing the latex of a perfluorohaloolefin copolymer with a creaming agent to produce a concentrated latex.

Having thus described my invention I claim:

1. The process which comprises admixing a latex of a copolymer of chlorotrifluoroethylene and vinylidene fluoride containing less than 50 percent solid polymer particles with between about 0.001 and about 5 parts by weight of ammonium alginate per 100 parts of polymer at a temperature between about 0° C. and about 100° C., to produce a latex containing about 70 percent solid polymer particles.

2. An admixture comprising a latex of a copolymer of chlorotrifluoroethylene and vinylidene fluoride and between about 0.001 and about 5 parts by weight per 100 parts of total copolymer of a member of the group consisting of ammonium alginate, sodium alginate and potassium alginate, which admixture contains at least about 65 percent solid copolymer particles.

References Cited in the file of this patent

UNITED STATES PATENTS

| | | |
|---|---|---|
| 2,393,261 | Peaker | Jan. 22, 1946 |
| 2,423,766 | Freeman | July 8, 1947 |
| 2,446,101 | Peaker | July 27, 1948 |
| 2,613,193 | Osdal | Oct. 7, 1952 |
| 2,750,350 | Kroll | June 12, 1956 |